(12) United States Patent  
Callesen

(10) Patent No.: US 9,810,329 B2  
(45) Date of Patent: Nov. 7, 2017

(54) VALVE GROUP AND INLET MODULE OF A VALVE GROUP

(71) Applicant: Danfoss Power Solutions ApS, Nordborg (DK)

(72) Inventor: Frede Callesen, Odnense S. (DK)

(73) Assignee: Danfoss Power Solutions ApS, Nordborg (DK)

( * ) Notice: Subject to any disclaimer, the term of this patent is extended or adjusted under 35 U.S.C. 154(b) by 58 days.

(21) Appl. No.: 14/887,513

(22) Filed: Oct. 20, 2015

(65) Prior Publication Data

US 2016/0138724 A1    May 19, 2016

(30) Foreign Application Priority Data

Nov. 14, 2014   (EP) .................................... 14193200

(51) Int. Cl.
*F15B 11/16*    (2006.01)
*F16K 11/06*    (2006.01)
(Continued)

(52) U.S. Cl.
CPC ............ *F16K 11/06* (2013.01); *F15B 13/086* (2013.01); *F15B 19/005* (2013.01);
(Continued)

(58) Field of Classification Search
CPC .... F15B 11/161; F15B 11/165; F15B 13/086; F15B 19/005; F15B 20/008;
(Continued)

(56) References Cited

U.S. PATENT DOCUMENTS

2003/0078697 A1    4/2003   Kockemann
2007/0169471 A1    7/2007   Rieth
(Continued)

FOREIGN PATENT DOCUMENTS

CN    102635579 A    8/2012
CN    203623770 U    6/2014
(Continued)

OTHER PUBLICATIONS

European Search Report for European Patent Application No. EP14193200 dated Jun. 8, 2015.

*Primary Examiner* — Marina Tietjen
*Assistant Examiner* — Paul J Gray
(74) *Attorney, Agent, or Firm* — McCormick, Paulding & Huber LLP

(57) ABSTRACT

A valve group includes an inlet module and at least one service module connected to the inlet module, the inlet module having a housing, a pressure port, a pressure gallery, a tank port, a tank gallery, a spool movable in the housing to interrupt in a first position a connection between the pressure port and the pressure gallery and to connect in a second position the pressure port and the pressure gallery. A first pressure transducer is provided to detect a first pressure in the pressure gallery and a second pressure transducer is provided to detect a second pressure in the tank gallery, the pressure transducers being connected to a controller determining the position of the spool based on the pressures read from the pressure transducers.

16 Claims, 3 Drawing Sheets

(51) Int. Cl.
*F15B 20/00* (2006.01)
*F16K 27/04* (2006.01)
*F16K 31/02* (2006.01)
*G05D 7/06* (2006.01)
*F15B 13/08* (2006.01)
*F15B 19/00* (2006.01)
*F15B 13/04* (2006.01)

(52) U.S. Cl.
CPC ............ *F15B 20/008* (2013.01); *F16K 27/04* (2013.01); *F16K 31/02* (2013.01); *G05D 7/0635* (2013.01); *F15B 11/161* (2013.01); *F15B 11/165* (2013.01); *F15B 2013/0413* (2013.01); *F15B 2211/6306* (2013.01); *F15B 2211/6309* (2013.01); *F15B 2211/857* (2013.01); *F15B 2211/87* (2013.01)

(58) Field of Classification Search
CPC ...... F15B 2211/6306; F15B 2211/6309; F15B 2013/0413
USPC .......................................... 60/420, 422, 484
See application file for complete search history.

(56) References Cited

U.S. PATENT DOCUMENTS

2010/0192562 A1* 8/2010 Heemskerk ........... F15B 11/042
 60/327
2010/0300086 A1* 12/2010 Buttner ................. E02F 9/2232
 60/420

FOREIGN PATENT DOCUMENTS

| EP | 0 796 952 A1 | 9/1997 |
| EP | 1 108 895 A1 | 6/2001 |
| WO | 2013/085416 A1 | 6/2013 |

\* cited by examiner

VALVE GROUP AND INLET MODULE OF A VALVE GROUP

CROSS REFERENCE TO RELATED APPLICATIONS

Applicant hereby claims foreign priority benefits under U.S.C. §119 from European Patent Application No. EP 14193200 filed on Nov. 14, 2014, the contents of which are incorporated by reference herein.

TECHNICAL FIELD

The present invention relates to a valve group comprising an inlet module and at least one service module connected to said inlet module, said inlet module having a housing, a pressure port, a pressure gallery, a tank port, a tank gallery, a spool movable in said housing to interrupt in a first position a connection between said pressure port and said pressure gallery and to connect in a second position said pressure port and said pressure gallery.

Furthermore, the invention relates to an inlet module of such a valve group.

BACKGROUND

In a hydraulic control system typically a valve group is used having an inlet module connected to a pump (or another pressure source) and a tank reservoir and several service modules connected to particular work functions. For safety aspects it might be necessary to block the service modules from the pump supply line. Such a safety function can be realized by controlling a spool which is implemented in the inlet module to open or close a connection between the pump port of the inlet module and a common pressure line in the valve group which is connected to the pressure gallery of the inlet module.

Such a safety function should be monitored. This typically requires a position transducer equipment measuring the displacement of the spool.

Although such a position transducer allows to reliably obtain an information about the position of the spool, it requires additional elements which have to be accommodated in or at the housing.

SUMMARY

The object underlying the invention is to have a simple construction of the inlet module.

This object is solved in a valve group of the kind mentioned at the outlet in that said spool in said first position connects said pressure gallery and said tank gallery, wherein a first pressure transducer is provided to detect a first pressure in said pressure gallery and a second pressure transducer is provided to detect a second pressure in said tank gallery, said first pressure transducer and said second pressure transducer being connected to control means determining the position of said spool to be said first position when said first transducer and said second transducer read a same pressure below a predetermined first threshold pressure and to be said second position when said pressure transducer reads a higher pressure than said second pressure transducer.

In such a construction there is no need for a mechanical or optical position sensor detecting the actual position of the spool. It is necessary only to have a first pressure transducer reading the pressure in the pressure gallery, i.e., the common pressure line of the valve group, and a second pressure transducer permanently reading the pressure in another cavity which can have either tank pressure or load pressure or another pressure. The information provided by both pressure transducer readings allows an explicit identification of the spool's state or position. The given correlation between pressure readings and spool state enables an attractive solution since it is not necessary to determine the exact position of the spool. It is only necessary to monitor whether the spool is in the first position or in the second position.

In a preferred embodiment said inlet module comprises a load sensing port and a high pressure carry over port, wherein said spool is moveable in a third position, in which said pressure gallery is blocked, said high pressure carry over port is connected to the pressure port, and said load sensing port is connected to said tank gallery, and said control means determines the position of said spool to be said third position when said first pressure transducer reads the pressure lower than said second pressure transducer. Although only two pressure transducers are available, three positions of the spool can be reliably determined.

In a further preferred embodiment said spool is movable in a fourth position, in which said pressure port is connected to said pressure gallery, said high pressure carry over port is blocked, said load sensing port is connected to said pressure gallery and to said tank gallery and said control means determines the position of said spool to be said fourth position when said first pressure transducer and said second pressure transducer read the same pressure higher than a predetermined second threshold pressure. Although only two pressure sensors are available, it is possible to monitor four positions of the spool. This monitoring makes use of the effect that each pressure transducer can detect two different pressures and the spool positions are such that each spool position is assigned to one of the four possible combinations of the two pressure levels read by the two pressure transducers.

In a preferred embodiment said spool comprises a first groove and a second groove on the outside, and a channel inside, wherein in said first position said first groove connects said pressure gallery and said tank gallery and said second groove connects said tank gallery and said tank port, and said channel connects said load sensing port, said high pressure carry over port and said tank port. Even with a relatively simple construction of the spool it is possible to guide the pressures to the points where the two pressure transducers can read them.

Preferably said spool comprises a third groove on the outside, wherein in said second position said second groove connects said tank port and said tank gallery and said third groove connects said pressure port and said pressure gallery. The use of the groove to connect the pressure port and the pressure gallery allows for a rather large flow of hydraulic fluid which is in some cases necessary.

It is preferred that in said second position said channel is isolated from all ports and galleries. In the second position the flow of hydraulic fluid from the pressure port to the pressure gallery and from the tank gallery to the tank port takes place only through grooves on the outside of the spool.

It is also preferred that in said third position said channel connects said pressure port, said high pressure carry over port, said load sensing port and said tank gallery, and said third groove connects said high pressure carry over port and said pressure port. The channel is used to transmit pressures only. There is no need for large volume flow to the channel.

It is also preferred that said spool comprises a fourth groove on the outside, wherein in said fourth position said fourth groove connects said pressure port and said pressure gallery and said channel connects said load sensing port, said pressure gallery and said tank gallery. This allows for simple construction.

Preferably said first pressure transducer is arranged in said pressure gallery and said second pressure transducer is arranged in said tank gallery. A pressure transducer does not require much space. Therefore, it is possible to position the two pressure transducers inside the housing.

The invention relates as well to an inlet module of such a valve group.

BRIEF DESCRIPTION OF THE DRAWINGS

A preferred embodiment of the invention will now be described in more detail with reference to the drawing, wherein.

DETAILED DESCRIPTION

Figure 1:
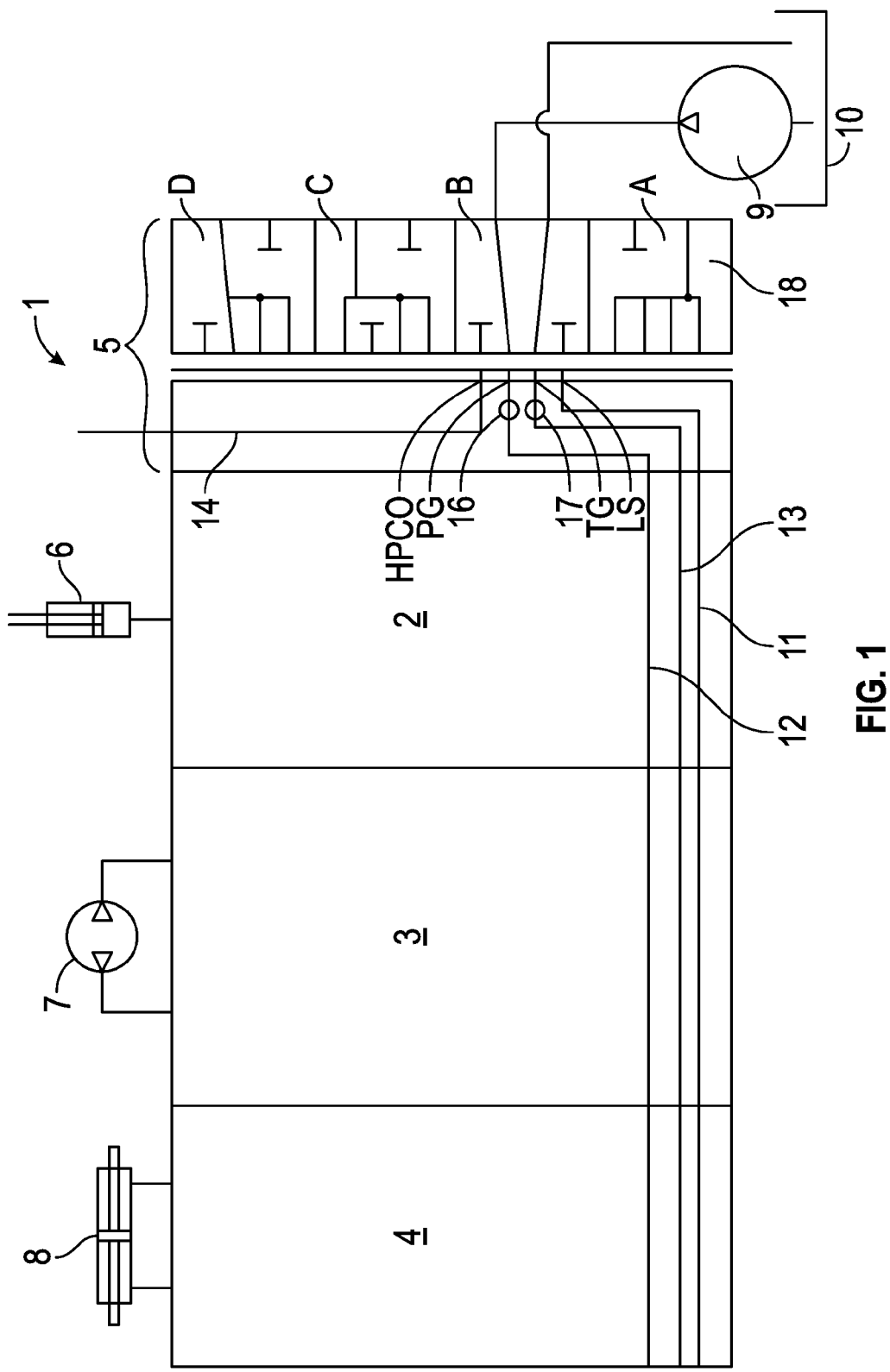
FIG. 1 shows schematically a valve group.

FIG. 1 schematically shows a valve group 1 having three service modules 2, 3, 4 and an inlet module 5. The service modules 2, 3, 4 are connected to the inlet module 5. Furthermore, each service module is provided to control the operation of a hydraulic consumer 6, 7, 8. The inner construction of the service modules 2-4 depends on their function. Such service modules 2-4 are known per se. They are not described in more detail here.

The inlet module 5 comprises a pressure port PP, which is connected to a pump 9 or any other pressure force. Furthermore, the inlet module 5 comprises a tank port TP which is connected to a tank 10.

Furthermore, the inlet module 5 comprises a load sensing port LS which is connected to a load sensing line 11 of the inlet module 5. The inlet module 5 comprises furthermore a pressure gallery PG connected to a pressure line 12 supplying all service modules 2, 3, 4 with hydraulic fluid under pressure, if the inlet module 5 establishes a connection between the pressure port PP and the pressure gallery PG. Furthermore, the inlet module 5 comprises a tank gallery TG connected to a tank line 13 running through all service modules 2, 3, 4. Finally, the inlet module 5 comprises a high pressure carry over port HPCO connected to a line 14 leading out of the valve group 1, for example to another valve group 1.

A first pressure transducer 16 is arranged in the pressure gallery PG and a second pressure transducer 17 is arranged in the tank gallery TG. It is preferred that the two pressure transducers 16, 17 are directly arranged in a housing 19 of the inlet module 5. However, it is also possible to have small channels or bores to connect the first pressure transducer 16 with the pressure gallery PG and to connect the second pressure transducer 17 with the tank gallery TG.

The two pressure transducers 16, 17 are connected to control means 18 which are arranged in the housing 19 of the inlet module as well. The control means 18 are able to compare the pressures read by the two pressure transducers 16, 17 and to compare them with each other and, if necessary, with threshold values which will be explained later.

The inlet module 5 comprises a spool 20 which is moveable in the housing 19. The spool 20 can be moved into four different positions which will be explained in the following.

In a first position A, which is named "neutral position" or "safe state" the pressure gallery PG, the high pressure carry over port HPCO, and the load sensing port LS are all connected to the tank port TP. The tank port TP is connected to the tank gallery TG. Therefore, the tank gallery TG and the pressure gallery PG have the same pressure. The two pressure transducers 16, 17 therefore read the same pressure. This pressure has a low pressure value corresponding to the tank pressure. When the control means 18 detect that the two pressures read by the pressure transducers 16, 17 are the same and have a low value, it is clear that the spool 20 is in the neutral position A. As an additional safety mean the control means 18 can check whether the low pressure is below a first threshold value.

In a second position B which is called "Crane mode" or "valve active mode" the pressure port PP is connected to the pressure gallery PG. The high pressure carry over port is blocked. The load sensing port LS is blocked as well. The tank gallery TG is connected to the tank port TP.

Consequently, the first pressure transducer 16 reads the working pressure of the pump 9. The second pressure transducer 17 reads a pressure with low pressure value, i.e. basically the tank pressure.

Therefore, the control means 18 can detect that the pressure read by the first pressure transducer 16 is higher than the pressure read by the second transducer 17. This information is sufficient to make a determination that the spool is in the second position B.

In a third position C, which is called "HPCO mode", the pump gallery PG is blocked. The high pressure carry over port HPCO is connected to the pressure port PP. The tank gallery TG is connected to the load sensing port LS. The tank gallery TG is as well connected to the high pressure carry over port HPCO.

In this position C of the spool 20 the first pressure transducer 16 reads an undefined pressure which is, however, certainly lower than the pressure in the tank gallery TG. The second pressure transducer 17 reads the load pressure at the high pressure carry over port HPCO which is the high pressure value.

The control means 18 can easily detect that the pressure read by the second pressure transducer 17 is higher than the pressure read by the first pressure transducer 16 and can therefore decide that the spool 20 is in the first position C.

The spool 20 can assume a fourth position D called "Manual Override". In this position D the pressure gallery PG is connected to the pressure port PP. The high pressure carry over port HPCO is blocked. The load sensing port LS is connected to the pressure gallery PG. The tank gallery TG is connected to the load sensing port LS.

In this position D of the spool 20 the first pressure transducer 16 and the second pressure transducer 17 read the same pressure, which is a high pressure. This can easily be detected by the control means 18. As an additional safety measure the control means 18 can check whether the pressure value of the pressures read by the two pressure transducers 16, 17 exceeds a second threshold pressure value.

The monitoring logic to detect the position of spool 20 can thus be understood from the following matrix:

| Reading of first pressure transducer 16 | Reading of second pressure transducer 17 | Spool state or position |
|---|---|---|
| Low | Low | A: Neutral |
| High | Low | B: Crane |
| Lower than T | High | C: HPCO |
| High | High | D: Manual Override |

FIG. 2-5 show the spool 20 in the different positions A-D.

Figure 2:
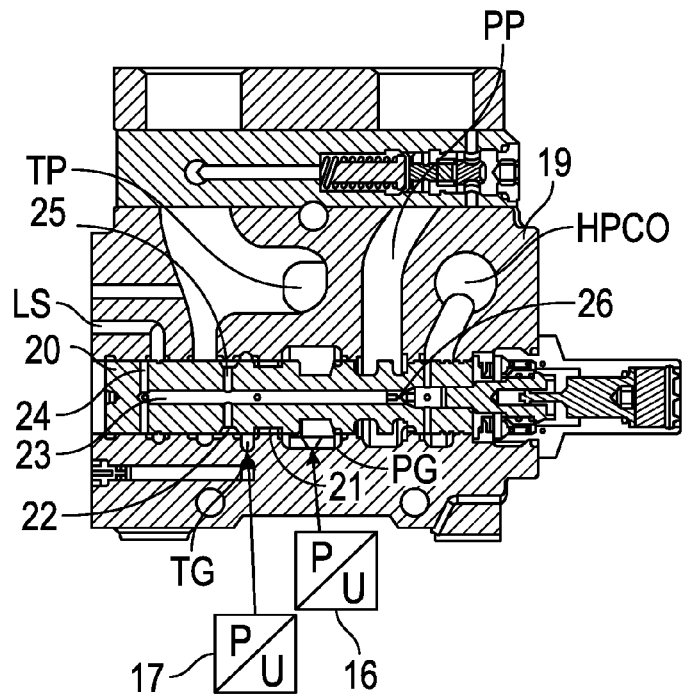
FIG. 2 shows an inlet module of the valve group with a spool in a first position.

FIG. 2 shows spool 20 in said first position A. Spool 20 has on its outside a first groove 21 connecting in the first position A of the spool the pressure gallery PG with a tank gallery TG. Furthermore, spool 20 has a second groove 22 connecting the tank gallery TG and the tank port TP. Furthermore, spool 20 has a channel 23 inside connecting a load sensing port LS, the high pressure carry over port HPCO and the tank port TP. To this end the spool 20 has a number of radial bores 24, 25, and a one way valve 26, the function of which is to secure that the LS pressure is not running to tank via HPCO port in position D.

Figure 3:
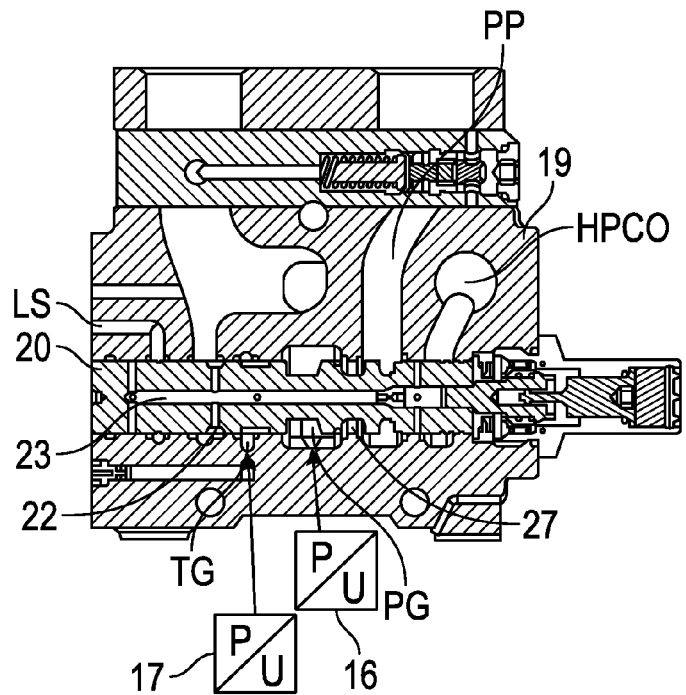
FIG. 3 shows the inlet module with the spool in a second position.

FIG. 3 shows spool 20 in the second position B (Crane mode). It can be seen that the spool 20 has on its outside a third groove 27 connecting the pressure port PP and the pressure gallery PG. Furthermore, the high pressure carry over port HPCO is blocked. Load sensing port LS is blocked as well. The tank gallery TG is connected to tank port TP by means of the second groove 22.

The channel 23 is not connected to any of the ports.

Figure 4:
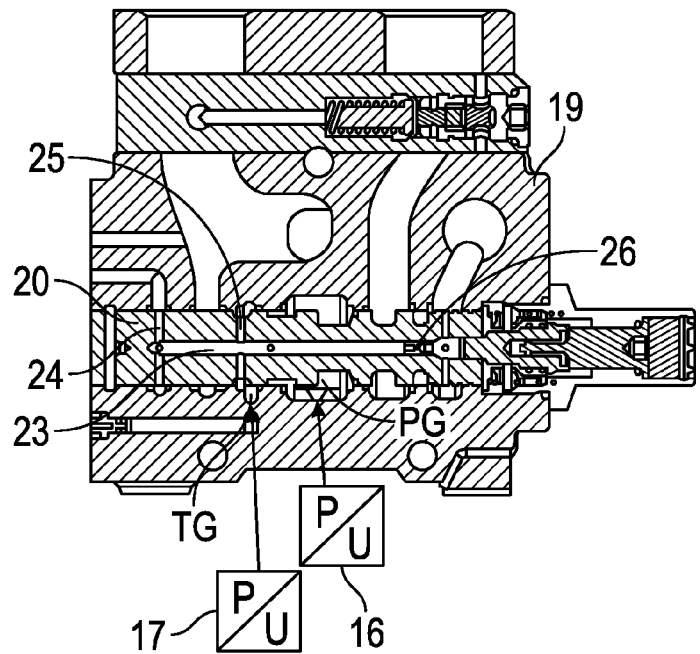
FIG. 4 shows the inlet module with the valve in the third position.

FIG. 4 shows the spool 20 in the third position C (HPCO mode).

The pressure gallery PG is blocked. The channel 23 connects the load sensing port LS and the high pressure carry over port HPCO. Furthermore, channel 23 connects the tank gallery TG and the load sensing port LS. In this position of spool 20 all pressures are transmitted via the channel 23.

Figure 5:
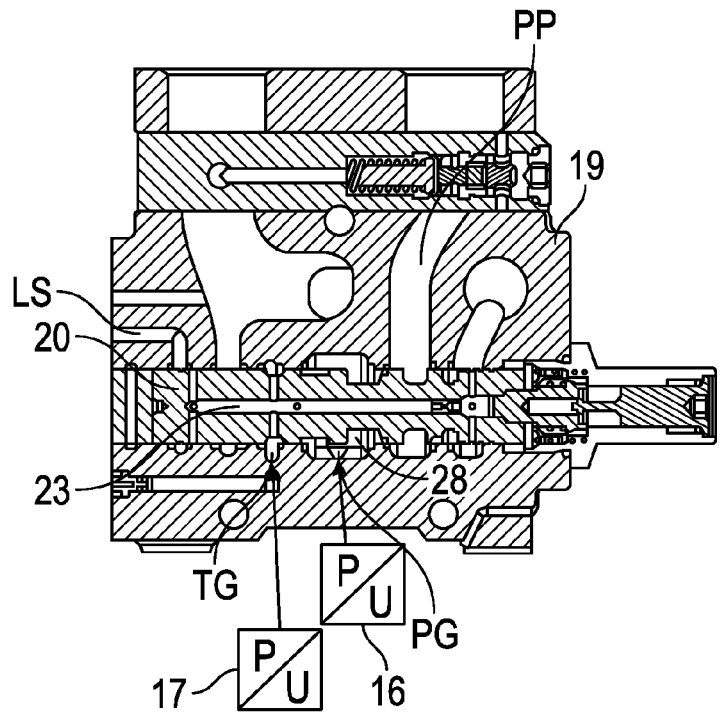
FIG. 5 shows the inlet module with the spool in a fourth position.

FIG. 5 shows the fourth position D (Manual Override) of the spool 20. The spool 20 comprises a fourth groove 28 on the outside connecting the pressure port PP and the pressure gallery PG. Furthermore, the channel 23 connects the load sensing port LS and the tank gallery TG.

The spool 20 can be activated in any known way. The preferred activation principle is based on an electric input. The spool 20 can, for example, be activated hydraulically with a pilot "fluid" delivered from a bridge of four magnet valves.

However, it could be activated in other ways, for example magnetically.

The present invention has advantages with respect to a security aspect. If the pressure sensors show that the spool 20 is in a position different to a desired position given by a command, it triggers a failure reaction. In this case, for example, current is interrupted and the spool is going to the neutral position. If the spool 20 is not in the neutral position during start-up, it also triggers a failure reaction.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A valve group comprising an inlet module and at least one service module connected to said inlet module, said inlet module having a housing, a pressure port (PP), a pressure gallery (PG), a tank port (TP), a tank gallery (TG), a load sensing port (LS), a high pressure carry over port (HPCO) and a spool movable in said housing to interrupt in a first position (A) a connection between said pressure port (PP) and said pressure gallery (PG) and to connect in a second position (B) said pressure port (PP) and said pressure gallery (PG), wherein said spool in said first position (A) connects said pressure gallery (PG) and said tank gallery (TG), wherein a first pressure transducer is provided to detect a first pressure in said pressure gallery (PG) and a second pressure transducer is provided to detect a second pressure in said tank gallery (TG), said first pressure transducer and said second pressure transducer being connected to a controller determining the position of said spool to be said first position (A) when said first transducer and said second transducer read a same pressure below a predetermined first threshold pressure and to be said second position (B) when said first pressure transducer reads a higher pressure than said second pressure transducer, wherein said spool comprises a first groove and a second groove on the outside, and a channel inside, wherein in said first position said first groove connects said pressure gallery (PG) and said tank gallery (TG) and said second groove connects said tank gallery (TG) and said tank port (TP), and said channel connects said load sensing port (LS), said high pressure carry over port (HPCO) and said tank port (TP).

2. The valve group according to claim 1, wherein said spool is movable in a third position (C), in which said pressure gallery (PG) is blocked, said high pressure carry over port (HPCO) is connected to said pressure port (PP), and said load sensing port (LS) is connected to said tank gallery (TG), and said controller determines the position of said spool to be said third position (C) when said first pressure transducer reads a pressure lower than said second pressure transducer.

3. The valve group according to claim 2, wherein said spool is movable in a fourth position (D), in which said pressure port (PP) is connected to said pressure gallery (PG), said high pressure carry over port (HPCO) is blocked, said load sensing port (LS) is connected to said pressure gallery (PG), and to said tank gallery (TG) and said controller determines the position of said spool to be said fourth position (D) when said first pressure transducer and said second pressure transducer read the same pressure higher than a predetermined second threshold pressure.

4. The valve group according to claim 1, wherein said spool comprises a third groove on the outside, wherein in said second position (B) said second groove connects said tank port (TP) and said tank gallery (TG) and said third groove connects said pressure port (PP) and said pressure gallery (PG).

5. The valve group according to claim 4, wherein in said second position (B) said channel is isolated from all ports and galleries.

6. The valve group according to claim 5, wherein in said third position (C) said channel connects said pressure port (PP), said high pressure carry over port (HPCO), said load sensing port (LS) and said tank gallery (TG), and said third groove connects said high pressure carry over port (HPCO) and said pressure port (PP).

7. The valve group according to claim 6, wherein said spool comprises a fourth groove on the outside, wherein in said fourth position (D) said fourth groove connects said pressure port (PP) and said pressure gallery (PG) and said channel connects said load sensing port (LS) and said tank gallery (TG).

8. The valve group according to claim 1, wherein said first pressure transducer is arranged in said pressure gallery (PG) and said second pressure transducer is arranged in said tank gallery (TG).

9. The valve group according to claim 2, wherein said first pressure transducer is arranged in said pressure gallery (PG) and said second pressure transducer is arranged in said tank gallery (TG).

10. The valve group according to claim 3, wherein said first pressure transducer is arranged in said pressure gallery (PG) and said second pressure transducer is arranged in said tank gallery (TG).

11. The valve group according to claim 4, wherein said first pressure transducer is arranged in said pressure gallery (PG) and said second pressure transducer is arranged in said tank gallery (TG).

12. The valve group according to claim 5, wherein said first pressure transducer is arranged in said pressure gallery (PG) and said second pressure transducer is arranged in said tank gallery (TG).

13. The valve group according to claim 6, wherein said first pressure transducer is arranged in said pressure gallery (PG) and said second pressure transducer is arranged in said tank gallery (TG).

14. The valve group according to claim 7, wherein said first pressure transducer is arranged in said pressure gallery (PG) and said second pressure transducer is arranged in said tank gallery (TG).

15. A valve group comprising an inlet module and at least one service module connected to said inlet module, said inlet module having a housing, a pressure port (PP), a pressure gallery (PG), a tank port (TP), a tank gallery (TG), a spool movable in said housing to interrupt in a first position (A) a connection between said pressure port (PP) and said pressure gallery (PG) and to connect in a second position (B) said pressure port (PP) and said pressure gallery (PG), wherein said spool in said first position (A) connects said pressure gallery (PG) and said tank gallery (TG), wherein a first pressure transducer is provided to detect a first pressure in said pressure gallery (PG) and a second pressure transducer is provided to detect a second pressure in said tank gallery (TG), said first pressure transducer and said second pressure transducer being connected to a controller determining the position of said spool to be said first position (A) when said first transducer and said second transducer read a same pressure below a predetermined first threshold pressure and to be said second position (B) when said first pressure transducer reads a higher pressure than said second pressure transducer, wherein said inlet module comprises a load sensing port (LS) and a high pressure carry over port (HPCO), wherein said spool is movable in a third position (C), in which said pressure gallery (PG) is blocked, said high pressure carry over port (HPCO) is connected to said pressure port (PP), and said load sensing port (LS) is connected to said tank gallery (TG), and said controller determines the position of said spool to be said third position (C) when said first pressure transducer reads a pressure lower than said second pressure transducer, and wherein said spool is movable in a fourth position (D), in which said pressure port (PP) is connected to said pressure gallery (PG), said high pressure carry over port (HPCO) is blocked, said load sensing port (LS) is connected to said pressure gallery (PG), and to said tank gallery (TG) and said controller determines the position of said spool to be said fourth position (D) when said first pressure transducer and said second pressure transducer read the same pressure higher than a predetermined second threshold pressure.

16. An inlet module for a valve group, the inlet module comprising a housing, a pressure port (PP), a pressure gallery (PG), a tank port (TP), a tank gallery (TG), a load sensing port (LS), a high pressure carry over port (HPCO) and a spool movable in said housing to interrupt in a first position (A) a connection between said pressure port (PP) and said pressure gallery (PG) and to connect in a second position (B) said pressure port (PP) and said pressure gallery (PG), wherein said spool in said first position (A) connects said pressure gallery (PG) and said tank gallery (TG), wherein a first pressure transducer is provided to detect a first pressure in said pressure gallery (PG) and a second pressure transducer is provided to detect a second pressure in said tank gallery (TG), said first pressure transducer and said second pressure transducer being connected to a controller determining the position of said spool to be said first position (A) when said first transducer and said second transducer read a same pressure below a predetermined first threshold pressure and to be said second position (B) when said first pressure transducer reads a higher pressure than said second pressure transducer, wherein said spool comprises a first groove and a second groove on the outside, and a channel inside, wherein in said first position said first groove connects said pressure gallery (PG) and said tank gallery (TG) and said second groove connects said tank gallery (TG) and said tank port (TP), and said channel connects said load sensing port (LS), said high pressure carry over port (HPCO) and said tank port (TP).

\* \* \* \* \*

UNITED STATES PATENT AND TRADEMARK OFFICE
CERTIFICATE OF CORRECTION

PATENT NO. : 9,810,329 B2
APPLICATION NO. : 14/887513
DATED : November 7, 2017
INVENTOR(S) : Frede Callesen Page 1 of 1

It is certified that error appears in the above-identified patent and that said Letters Patent is hereby corrected as shown below:

On the Title Page

Item (72) should read:
(72) Inventor: Frede Callesen, Odense S. (DK)

Signed and Sealed this
Twentieth Day of February, 2018

Andrei Iancu
*Director of the United States Patent and Trademark Office*